(12) United States Patent
Weingardt et al.

(10) Patent No.: US 11,745,144 B2
(45) Date of Patent: Sep. 5, 2023

(54) BRIDGE SUPPORT AND REDUCED FEED SPACERS FOR SPIRAL-WOUND ELEMENTS

(71) Applicant: Aqua Membranes Inc., Albuquerque, NM (US)

(72) Inventors: Kendall Weingardt, Albuquerque, NM (US); Rodney E Herrington, Albuquerque, NM (US); Kevin Roderick, Albuquerque, NM (US)

(73) Assignee: Aqua Membranes Inc., Albuquerque, NM (US)

( * ) Notice: Subject to any disclaimer, the term of this patent is extended or adjusted under 35 U.S.C. 154(b) by 410 days.

(21) Appl. No.: 16/647,381

(22) PCT Filed: Oct. 12, 2018

(86) PCT No.: PCT/US2018/055671
§ 371 (c)(1),
(2) Date: Mar. 13, 2020

(87) PCT Pub. No.: WO2019/075370
PCT Pub. Date: Apr. 18, 2019

(65) Prior Publication Data
US 2021/0031146 A1    Feb. 4, 2021

Related U.S. Application Data

(60) Provisional application No. 62/572,230, filed on Oct. 13, 2017.

(51) Int. Cl.
*B01D 63/10* (2006.01)
*B32B 7/05* (2019.01)
(Continued)

(52) U.S. Cl.
CPC .......... *B01D 63/103* (2013.01); *B01D 63/10* (2013.01); *B32B 1/08* (2013.01); *B32B 7/05* (2019.01);
(Continued)

(58) Field of Classification Search
CPC ........................... B01D 63/103; B01D 63/10; B01D 2313/143; B01D 2313/14; B32B 1/08;
(Continued)

(56) References Cited

U.S. PATENT DOCUMENTS 3,963,621 A    6/1976  Newman
4,187,173 A    2/1980  Keefer
(Continued)

FOREIGN PATENT DOCUMENTS

CA    2662925 A1    1/2009
CA    2825674 C    8/2011
(Continued)

*Primary Examiner* — Christopher W Raimund
(74) *Attorney, Agent, or Firm* — V Gerald Grafe

(57) ABSTRACT

Embodiments of the invention provide replacements for a continuous layer of feed spacer mesh in spiral-wound reverse osmosis elements and replacing such mesh with discrete regions of feed spacer supporting the inlet and outlet ends of the element and a stiffening bridge feature to bridge between these regions at the tail end of each membrane leaf comprising the element during the element rolling process. The stiffening bridge feature prevents inward deflection of the inner layer of the membrane leaf during rolling, facilitating proper sealing of the adhesive through the permeate carrier to the adjacent membrane film using known membrane rolling techniques.

6 Claims, 4 Drawing Sheets

(51) Int. Cl.
  *B32B 1/08* (2006.01)
  *B32B 7/14* (2006.01)
  *B32B 37/12* (2006.01)
  *B32B 37/18* (2006.01)
  *B32B 38/10* (2006.01)
  *B32B 38/18* (2006.01)

(52) U.S. Cl.
  CPC ............ *B32B 7/14* (2013.01); *B32B 37/1292* (2013.01); *B32B 37/18* (2013.01); *B32B 38/10* (2013.01); *B32B 38/1808* (2013.01); *B01D 2313/143* (2013.01); *B32B 2305/026* (2013.01); *B32B 2597/00* (2013.01)

(58) Field of Classification Search
  CPC ......... B32B 7/05; B32B 7/14; B32B 37/1292; B32B 37/18; B32B 38/10; B32B 38/1808; B32B 2305/026; B32B 2597/00; B32B 2250/03; B32B 2255/26; B32B 7/12
  See application file for complete search history.

(56) References Cited

U.S. PATENT DOCUMENTS

| | | |
|---|---|---|
| 4,208,289 A | 6/1980 | Bray |
| 4,222,874 A | 9/1980 | Connelly |
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |
| 4,842,736 A | 6/1989 | Bray |
| 4,844,805 A | 7/1989 | Solomon |
| 4,855,058 A | 8/1989 | Holland et al. |
| 4,856,559 A | 8/1989 | Lipshultz et al. |
| 4,869,821 A | 9/1989 | Korin |
| 4,874,514 A | 10/1989 | Casey, Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |

(56) References Cited

U.S. PATENT DOCUMENTS

| | | |
|---|---|---|
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2008/0290031 A1 | 11/2008 | Popa |
| 2012/0018366 A1 | 1/2012 | Buser |
| 2012/0097597 A1* | 4/2012 | Billovits ............ B01D 65/003 210/321.83 |
| 2012/0298578 A1 | 11/2012 | Herrington |
| 2013/0334128 A1 | 12/2013 | Takagi et al. |
| 2015/0068971 A1 | 3/2015 | Koiwa |
| 2015/0298064 A1 | 10/2015 | Takagi et al. |
| 2015/0343388 A1 | 12/2015 | Hester et al. |
| 2016/0008763 A1 | 1/2016 | Roderick et al. |
| 2016/0236132 A1 | 8/2016 | Hara et al. |
| 2017/0007970 A1 | 1/2017 | Baruch et al. |

FOREIGN PATENT DOCUMENTS

| | | |
|---|---|---|
| EP | 2902094 | 8/2015 |
| WO | WO2010047360 A1 | 4/2010 |
| WO | WO2015016253 A1 | 2/2015 |
| WO | WO2002/055179 | 8/2015 |
| WO | WO2016199272 A1 | 12/2016 |
| WO | WO2017087461 A1 | 5/2017 |

* cited by examiner

BRIDGE SUPPORT AND REDUCED FEED SPACERS FOR SPIRAL-WOUND ELEMENTS

CROSS-REFERENCE TO RELATED APPLICATIONS

This application is a national stage application under 35 U.S.C. 371 of PCT application PCT/US2018/055671, filed 12 Oct. 2018, which claims priority to U.S. provisional application 62/572,230, filed 13 Oct. 2017. Each of the foregoing is incorporated by reference herein.

TECHNICAL FIELD

The present invention relates to the field of membranes for spiral wound elements such as those used in reverse osmosis systems.

BACKGROUND ART

Spiral-wound elements are known in the art and traditionally consist of a coated, porous sheet of semipermeable membrane sealed to a porous mesh which allows longitudinal flow of separated fluid to a perforated center tube for collection. A conventional unit also comprises a woven or extruded, porous spacer mesh which allows for axial or longitudinal flow within the element. This mesh is typical for construction but provides significant disadvantages in forms of biofouling potential, resistance to flow, scale formation, and complications in construction.

Spiral-wound membrane improvements have been described by Barger et al. and Bradford et al. wherein the use of deposited islands or protrusions from the active, coated surface of the membrane sheet provide for support to maintain constant fluid flow spacing axially within the element in replacement of the woven or extruded porous mesh. These features when properly designed may reduce flow restriction in the feed channel and reduce opportunities for element fouling from biofilm growth, scale formation or particle capture as well as simplifying element manufacture.

When porous mesh is used to provide feed spacing in spiral-wound filtration elements, the mesh density is typically high enough to provide even support across the entire area of the element as it is rolled, which allows even pressure to be applied to the adhesive used while rolling to penetrate through the permeate carrier and into the membrane leaf edges to create the sealed envelope through which permeate flows. For element designs that do not use a separate spacer mesh, however, the lack of support from the separate mesh can lead to problems in assembly due to uneven or undesirable glue compaction, especially in the feed space area opposite the membrane from the permeate carrier adjacent to the glue lines.

DISCLOSURE OF INVENTION

The present invention provides improvements for the construction of spiral-wound elements for separation of fluid components having significantly reduced fluid flow resistance, increased channel flow area, less area of the membrane surface occluded from printed or deposited material, and increased ease of manufacturing. Specifically, the spiral-wound element is constructed using printed or deposited spacers including a solid longitudinal spacer to provide support for glue penetration and sealing near the tail end of the membrane sheet. The improved construction method may allow for no feed spacer to be used in the interior of the spiral would element.

Embodiments of the present invention provide a membrane sheet for use in a laminated composition with a permeate carrier, wherein the membrane sheet has an active surface configured to provide selective fluid separation and an inactive surface opposite the active surface, and wherein the membrane sheet has feed spacing elements disposed on the active surface in feed spacer regions near each of two opposing edges of the active surface, and wherein the membrane sheet has a stiffening bridge feature disposed on the active surface, the inactive surface, or a combination thereof in a region near an edge of the membrane sheet other than the two opposing edges.

Typically, such a membrane sheet is rectangular, with length greater than width, and the feed spacing elements are disposed along the length, or one half of the length such that when folded the feed spacing elements extend along the length of the folded sheet. In such a configuration, the stiffening bridge feature will be disposed along the width of the sheet near one end, such that, when folded, the stiffening bridge feature is at the end where the two ends come together. Such sheets are typically matched with a permeate carrier, have adhesive applied around the edges, then rolled about a collection tube to form a spiral wound element.

In some embodiments, the stiffening bridge feature is disposed on the active surface. In some embodiments, the stiffening bridge feature is disposed on the inactive surface. In some embodiments, a central region of the active surface of the membrane sheet, between the feed spacing regions, is empty of feed spacing elements. In some embodiments, the bridge stiffening feature is affixed to the membrane sheet and projects away from membrane sheet a distance at least equal to the height of the feed spacing elements. In some embodiments, the bridge stiffening feature is continuous across the membrane between the feed spacing regions. In some embodiments, the bridge stiffening feature comprises a plurality of elements that together span the membrane between the feed spacing regions.

Embodiments of the present invention provide a laminated composition for use in a spiral-wound membrane element, comprising: (a) a permeate carrier; (b) a membrane sheet having an active surface configured to provide selective fluid separation and an inactive surface opposite the active surface, and wherein the membrane sheet has feed spacing elements disposed on the active surface in regions near each of two opposing edges of the active surface, and wherein the membrane sheet has a stiffening bridge feature disposed on the active surface, the inactive surface, or a combination thereof in a region near an edge of the membrane sheet other than the two opposing edges; (c) wherein the membrane sheet is disposed such that the inactive surface is in contact with the permeate carrier. Such embodiments typically have adhesive applied around three edges (the end with the stiffening bridge feature plus the two long edges) and are then rolled about a collection tube to form a spiral wound element.

In some embodiments, the stiffening bridge feature is disposed on the active surface. In some embodiments, the stiffening bridge feature is disposed on the inactive surface. In some embodiments, a central region of the active surface of the membrane sheet is empty of feed spacing elements. In some embodiments, the bridge stiffening feature is affixed to the membrane sheet and projects away from membrane sheet a distance at least equal to the height of the feed spacing elements. In some embodiments, the bridge stiffening feature is continuous across the membrane between the feed spacing regions. In some embodiments, the bridge stiffening feature comprises a plurality of elements that together span the membrane between the feed spacing regions. In some embodiments, the membrane sheet is characterized as having a width and length, and the membrane sheet is folded along a fold line about the middle of the membrane sheet's length such that the active surfaces face each other; and the membrane sheet is disposed on the permeate carrier such that the stiffening bridge feature is on the portion of the membrane sheet that is distal from the permeate carrier.

Embodiments of the present invention provide a method of producing a spiral wound element, comprising: (a) providing a permeate carrier sheet having a length and width; (b) providing a collection tube; (c) providing a membrane sheet, having an active surface configured to provide selective fluid separation and an inactive surface opposite the active surface, and wherein the membrane sheet has feed spacing elements disposed on the active surface in regions near each of two opposing edges of the active surface, and wherein the membrane sheet has a stiffening bridge feature disposed on the active surface, the inactive surface, or a combination thereof in a region near an edge of the membrane sheet other than the two opposing edges, wherein the membrane sheet has a width substantially equal to the width of the permeate carrier and a length substantially equal to approximately twice the length of the permeate carrier; (d) folding the membrane sheet along a fold line extending along the width of the membrane sheet such that the active surface of the membrane sheet is inside the folded sheet; (e) placing the folded membrane sheet such that the inactive surface is in contact with the permeate carrier, forming an element leaf having a first end near the fold of the membrane sheet and a second end opposite and parallel to the fold, with the two opposing edges folded and connecting the first and second ends, and having a first portion near the permeate carrier and a second portion separated from the permeate carrier by the first portion; (f) applying adhesive to the membrane sheet, the permeate carrier, or a combination thereof, such that the adhesive extends across the membrane leaf near the first edge and near the two edges; (g) winding the element leaf around the collection tube, with the first end of the element leaf near the collection tube, forming a spiral wound element. The membrane sheet dimensions being "substantially equal" to permeate carrier dimensions means that the corresponding dimensions are close enough to equal to allow convenient assembly and rolling without undesirable waste. For example, the widths need not be exactly equal if the ends of the resulting element are trimmed as is customary, but they need to be close enough to equal that the trimmed element is suitable sealed. For example, the lengths might not be exactly equal due to slight differences required to accommodate the spiral winding of the sheets about the tube, but the lengths should be close enough to equal that the resulting spiral wound element does not have excessive lengths of excess membrane sheet or permeate carrier.

Some embodiments further comprise curing the adhesive, then removing a portion of the spiral wound element corresponding to the two edges of the element leaf, wherein the element leaf, after such removal, still has adhesive completely sealing the membrane sheet about the permeate carrier along the second end and the two edges.

In some embodiments, step (e) comprises placing the membrane sheet such that the stiffening bridge feature is with the second portion of the membrane sheet.

MODES FOR CARRYING OUT THE INVENTION AND INDUSTRIAL APPLICABILITY

Figure 1:
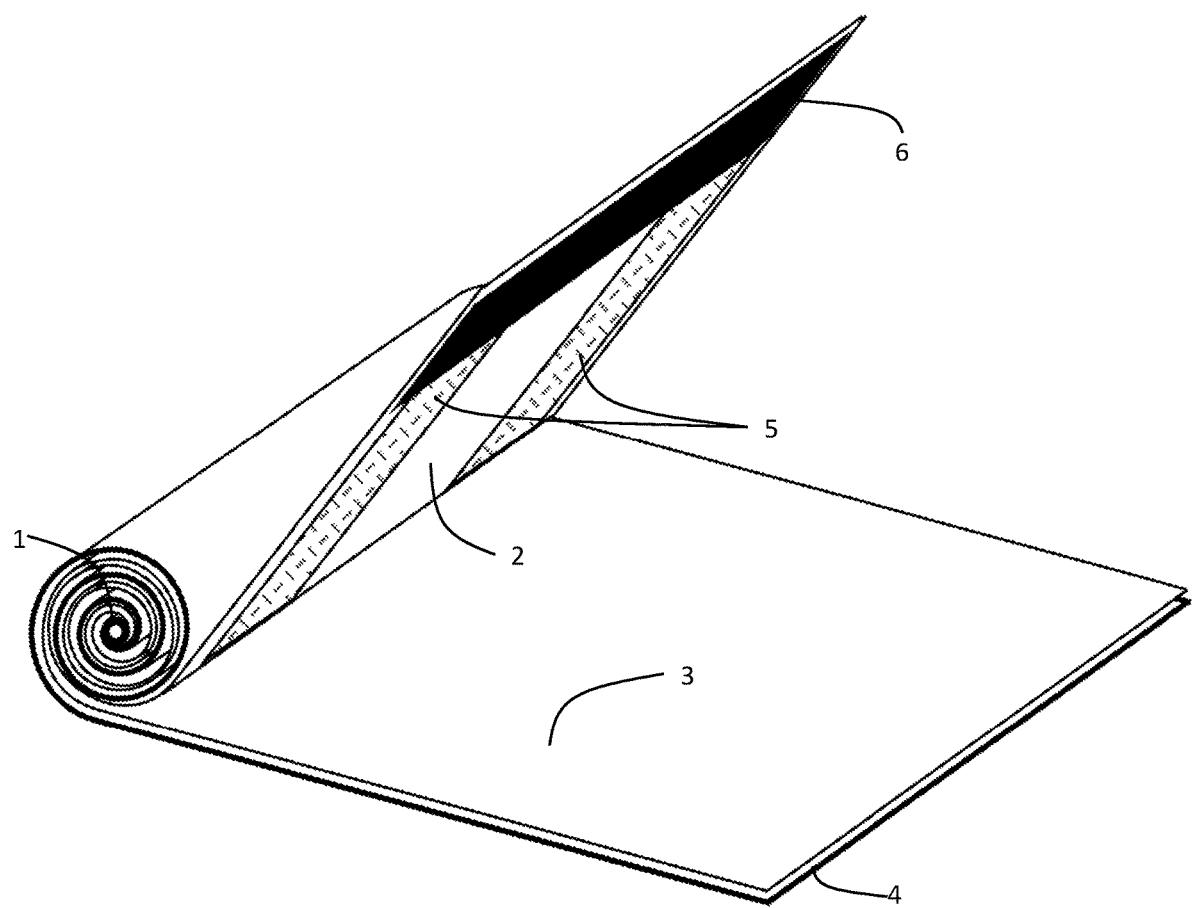
FIG. 1 is a view of a spiral-wound element composed of a central collection tube 1, an inner half 2 and an outer half 3 of a membrane leaf and a permeate carrier 4. The element contains edge spacing features 5 disposed on the side edges and a solid stiffening bridge feature 6 disposed at the tail of the innermost layer of the membrane sheet 2 on the active surface, where "innermost" means the layer of the membrane sheet that is closer to the tube when the element is rolled around the tube.

The following patents and applications can facilitate understanding of the invention, and are incorporated herein by reference: PCT/US2014/018813; PCT/US2018/016318; PCT/US2017/052116; PCT/US2017/062424; PCT/US2017/062425; PCT/US2018/027367; PCT/US2018/028453.

During element assembly or rolling, typically an adhesive is used to adhere the inner end of the permeate carrier to the center tube and simultaneously bond the permeate carrier to the membrane sheet along its three outer edges which acts to prevent entry fluid from either the feed or untreated/reject stream into the permeate carrier excepting that which passes through the membrane. The adhesive seals the edges of both the membrane sheet and the permeate carrier, forcing any flow of fluid from the feed to the permeate region to pass through the membrane. The adhesive seals simultaneously define the three edges of the permeate envelope and allow flow in this envelope to be directed towards the central collection tube. The central collection tube is commonly cylindrical in shape, but the "tube" can have any shape that is compatible with the assembly and operating characteristics desired.

The adhesive is typically applied before the spiral-wound element is rolled, and once the adhesive is cured, excess membrane, permeate carrier, and adhesive is trimmed away in a plane perpendicular to the axis of the cylindrical element at each end at a fixed length. For effective operation, it is necessary to provide spacing between adjacent active leaves of a spiral-wound element to allow inlet and outlet flow of the fluid to be separated. During element manufacture this spacer provides rigidity to maintain an open feed/reject channel while forcing penetration of the adhesive through the permeate carrier to seal the permeate envelope. In some elements, a continuous sheet of material was disposed between adjacent leaves to provide a feed spacer. Such continuous feed spacers can limit fluid flow and be subject to fouling.

In some elements, spacing features are placed, e.g., by deposition or printing, in only selected regions of the membrane. As an example, spacing features can be deposited only along the feed and untreated/reject edges of the element to provide the spacing required. Such spacing features also support the membrane to facilitate adhesive penetration mentioned above—the spacing features are disposed in areas opposite where the adhesive is deposited along the inlet and outlet edges of the membrane leaf, such that the spacers support the membrane sufficient to allow the membrane to encourage the desired glue penetration into the permeate carrier. The spacing features along the edges, however, do not provide support at the distal end of the leaf.

An example embodiment of the present invention provides a stiffening bridge feature that provides additional support at the distal end of the leaf. Additional regions of spacing features can also be employed in the element, but the stiffening bridge allows for empty regions between discontinuous spacing feature segments. The stiffening bridge feature is configured to confer more stiffness to the membrane sheet than the edge spacing features because, when the membrane is rolled into a spiral-wound element, the edge spacing features stack on top of each other in a spiral fashion providing support to each additional wind, while the stiffening bridge feature at the distal end has no support below it other than any material between the edge spacing features or strips. The stiffening bridge feature therefore should provide enough rigidity to provide support without significant inward deflection caused by the adhesive during the rolling process. The stiffening bridge feature adds flexural strength to the membrane leaf in proportion to the thickness of the stiffening bridge feature and the tensile strength of the material making up the stiffening bridge feature. Due to the thinness of a typical membrane film, a small amount of additional material in the stiffening bridge feature can significantly increase the flexural strength of the film/bridge system.

In some embodiments of the present invention, the area between the edge spacing features can be left empty, or can contain additional features either printed or deposited onto the membrane film in this region. Due to the edge spacing features supporting the element during the rolling process, these additional central features can be of any thickness up to the thickness of the edge spacing features. The central features, if present, can include features deposited or printed onto the membrane surface in a more sparse or different pattern than the edge spacing features. They can include mesh with a different geometry than the edge spacing features. These central features can be chosen for their ability to promote localized vorticity or turbulence within the fluid flow, or in order to minimize fouling potential within the spiral-wound element.

Embodiments of the present invention employ a discontinuous feed spacing element in combination with a stiffening bridge feature which enables proper adhesive seal to be made in the discontinuous regions during the element rolling process. The discontinuous feed spacing elements can comprise two discrete regions, one disposed at the inlet end and one disposed at the outlet end of the membrane leaf, with a gap between them. Other embodiments can comprise any configuration of feed spacing elements wherein the height of the spacer is discontinuous on length-scales of about 1" or greater, such as a feed spacer consisting of 3 distinct regions (one at each edge and one down the center of the leaf between them), or an extruded mesh which is manufactured with regions of different thickness. In any of the above situations, a stiffening bridge feature is added to allow standard element rolling techniques to be used to achieve a proper adhesive seal at the distal or tail end of the membrane leaf.

In an example embodiment of the present invention shown in FIG. 1, a single homogeneous stiffening bridge feature 6 is deposited onto the inner half 2 of the active surface of the membrane leaf, such that the when the leaf is folded and the spiral-wound element is assembled, stiffening bridge feature 6 is disposed at the distal end of the inner half of folded leaf 2 with respect to the central collection tube when rolled into an element. The height and shape of stiffening bridge feature 6 is configured to stiffen the membrane leaf in this region such that it supports the distal end of the membrane leaf to reduce deflection caused by the adhesive during the rolling process. The stiffening bridge feature can extend across the width of the membrane, as shown, or can extend only between the two regions having edge spacing features, e.g., if the regions having edge spacing features extend all the way to the end of the membrane. The stiffness desired can be determined based on the properties of the adhesive, the membrane, the permeate carrier, the rolling procedure and forces, and the adhesive penetration desired. Stiffening of the distal region can help ensure that the distal glue line used to create the laminated sandwich is forced to penetrate the sandwiched permeate carrier 4 and adhere to the opposing membrane sheet 3 without allowing the innermost membrane leaf 2 to deflect inwards towards the center of the spiral-wound element.

Figure 2:
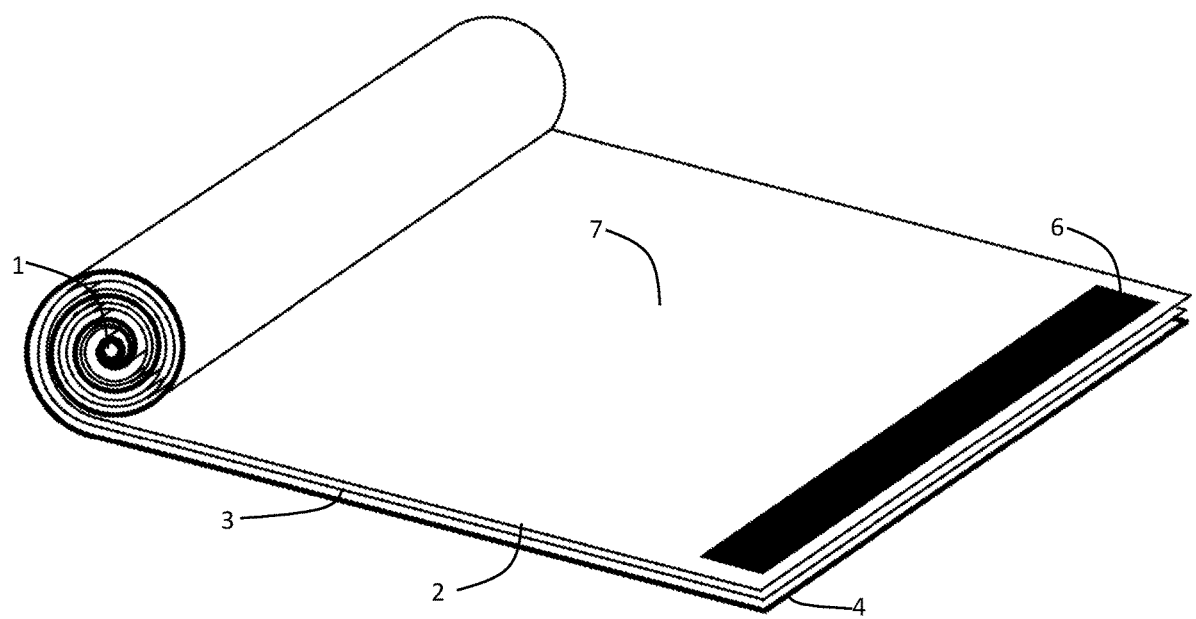
FIG. 2 is a view of a spiral-wound element composed of a central collection tube 1, an inner half 2 and an outer half 3 of a membrane leaf and a permeate carrier 4. The element contains a solid stiffening bridge feature 6 disposed at the tail of the inner layer of the membrane sheet 2 on the inactive surface 7. In this figure the edge spacing features are disposed on the underside of the inner half 2 of the membrane leaf, and therefore are not visible in the figure.

In another example embodiment of the present invention shown in FIG. 2, a single continuous stiffening strip 6 is deposited onto the inside or inactive support surface of membrane leaf 7, such that when the leaf is folded and the spiral-wound element is assembled, stiffening bridge feature 6 is disposed at the distal end of the membrane leaf, and on the inner half of the folded leaf 2 with respect to central collection tube 1 when rolled into an element. The height and shape of the feature is configured to provide additional stiffness to this section of the membrane during rolling to ensure that the glue used to create the laminated sandwich is forced to penetrate sandwiched permeate carrier 4 and adhere to opposing membrane sheet 3 without allowing inner membrane sheet 2 to bow in towards the center of the spiral-wound element.

In one example embodiment, a thin film composite membrane sheet 12" wide is cut to a length of 80". Edge supporting feed spacing elements comprise a pattern of alternating bars oriented 45° from the direction of fluid inlet to outlet flow and 90° from one another. Feed spacing elements are, in this example embodiment, about 0.25" in length, 0.018" in width, and 0.015" in height, and are deposited on the membrane surface using a UV-cured inkjet printer onto half of the membrane sheet on the active side, aligned into strips 2" wide along either longitudinal edge of membrane sheet and leaving 8" of the membrane sheet in the center unprinted. Other feed spacing element designs and processes can be suitable, for more examples see the PCT applications incorporated by reference herein. Additionally, a solid stiffening bridge feature is printed at the distal end of the printed half of membrane sheet, 12" wide, 1.5" long, and 0.015" high, deposited using the same UV cured inkjet process. Other dimensions can be appropriate; e.g., any width from one third to the full width of the sheet, any length from 0.1" to 5.0", or from 1" to 2.5"; and heights from 0.5 to 2.0 times the height of the feed spacing elements. After the edge support spacers and the stiffening bridge feature have been built, the leaf is folded so that the active surfaces of the membrane face one another, with the printed features on the inside of the folded leaf. The folded leaf is placed onto a 50"×12" length of permeate carrier with the unprinted half of the leaf oriented so that it is in contact with the permeate carrier. The permeate carrier is attached along one of the 12" edges to a 12" long center tube with a diameter of 0.67". The membrane leaf is placed on the permeate carrier such that the fold in the leaf is spaced about 5" from the attachment to center tube. Adhesive is applied in a continuous bead from a point starting at the attachment of permeate carrier to center tube one inch from the edge of the membrane leaf and continuing along one long edge, around the end opposite the fold, and back along the other long edge at the 1" distance from the edge. Subsequent to adhesive deposition, the leaf is rolled around the center tube to create the spiral-wound element with an outer diameter of about 1.8". After the adhesive has dried, the ends of the spiral wound element are trimmed off about 1" in from each edge of center tube, leaving a spiral wound element structure that is about 10" long×about 1.8" diameter on the 12" long center tube. On each edge of the element, approximately 1" of edge spacing feature remains which allows entry of the feed stream and egress of the reject stream. This description describes one example embodiment. However, these print patterns may apply to spiral would elements of different diameters and lengths.

Figure 3:
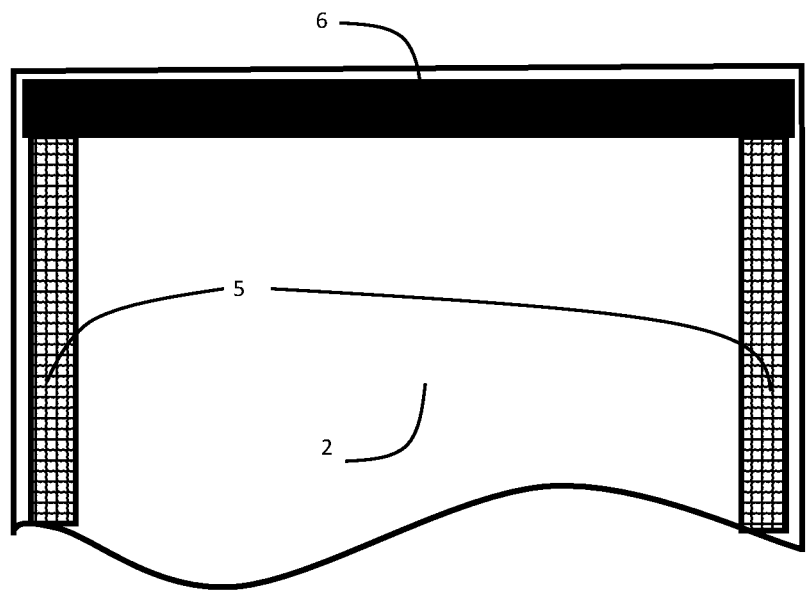
FIG. 3 is a view of the distal end of the inner half of an unrolled membrane sheet 2 with edge spacing features 5 on the sides and a fully homogeneous stiffening bridge feature 6 on the tail of the active surface of the membrane sheet.
Figure 4:
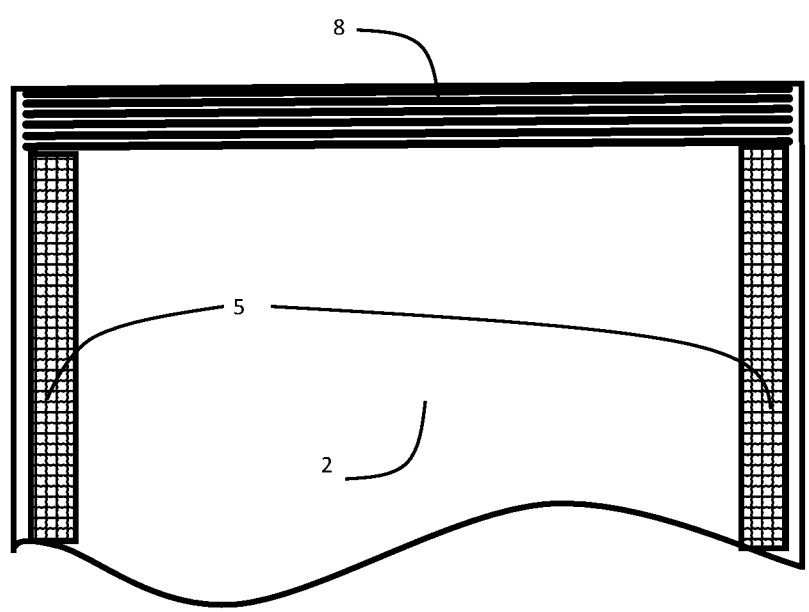
FIG. 4 is a view of the distal end of the inner half of an unrolled membrane sheet 2 with edge spacing features 5 on the sides and continuous adjacent stiffening strips 8 on the tail of the membrane sheet.
Figure 5:
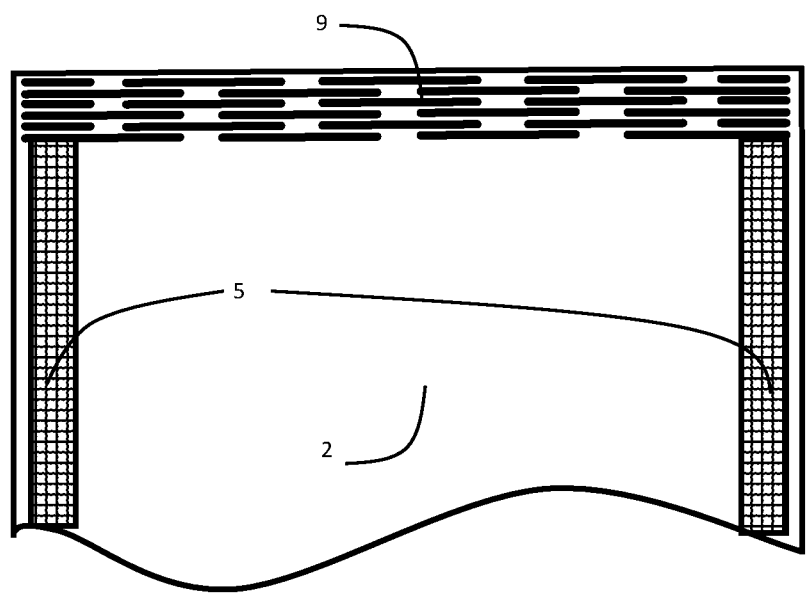
FIG. 5 is a view of the distal end of the inner half of an unrolled membrane sheet 2 with edge spacing features 5 on the sides and discontinuous adjacent stiffening strip segments 9 on the tail of the membrane sheet.

The stiffening bridge features can comprise various geometries, and different shapes can be used so long as they cover a sufficient area that they will support the area that the adhesive line at the distal or tail end of the membrane leaf will cover when rolled. The width of the adhesive line when fully compressed during rolling will typically range from 1" to 2.5" in length and will cover the entire width of the end of membrane leaf. FIGS. 3-5 illustrate several examples, including solid strips 6, sets of parallel lines 8 or line segments 9 which run parallel to central collection tube 1, or other complex shapes so long as they, in aggregate, prevent deflection of the region on which the features are printed or deposited toward center tube 1 during element rolling. Shapes that are not solid throughout the entirety of their dimensions can be preferable in order to use less material in their construction.

The stiffening bridge feature can be comprised of any number of materials which are compatible with the separated fluid and permeate carrier including, but not limited to, plastics, thermoplastics, reactive polymers, waxes, or resins.

The stiffening bridge feature can be deposited by a variety of techniques. Traditional printing techniques such as offset printing, gravure printing, and screen printing, can be suitable, although these deposition techniques can present thickness and geometry limitations. Thicker features can be deposited by microdispensing, inkjet printing, fused deposition, or via application using an adhesive that can include roll transfer of sheet or pick-and-place of individual features.

Edge spacing features are placed onto the active side of one or both sides of membrane leaves prior to rolling in order to maintain feed spacing during the rolling of the spiral-wound element. These edge spacing features can be left in place or partially removed during or subsequent to the trimming process after the spiral-wound element is rolled. Edge spacing features 5 allow compression of the adhesive during element rolling along the edges of the element to ensure that the adhesive completely infiltrates permeate carrier 4 and bonds to membrane sheet 2 on both sides of the permeate carrier while maintaining height separation at the edges roughly equivalent to the height of the feed spacer features.

Edge spacing features placed in this manner can be discrete strips or discontinuous segments (e.g., dots, lines, etc.). If discrete strips are used, they must either be completely removed during the subsequent trimming of the element, or comprised of a porous material to allow fluid flow through them if some portion of the strips is left in place after trimming. Porous edge spacing features can be comprised of a porous material, such as a woven or non-woven fabric or extruded or woven mesh, which does not extend into the interior of the element more than about one-half of an inch past the glue line in order to allow flow of feed fluid through the edge features.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

We claim:

1. A method of producing a spiral wound element, comprising:
   (a) providing a permeate carrier sheet having a length and width;
   (b) providing a collection tube;
   (c) providing a membrane sheet, having an active surface configured to provide selective fluid separation and an inactive surface opposite the active surface, and wherein the membrane sheet has feed spacing elements disposed on the active surface in regions near each of first and second opposing edges of the active surface, and wherein the membrane sheet has a stiffening bridge feature disposed on the active surface of the membrane sheet in a region near a third edge of the membrane sheet that is not one of the first and second opposing edges, wherein the membrane sheet has a width substantially equal to the width of the permeate carrier and a length substantially equal to about twice the length of the permeate carrier;
   (d) folding the membrane sheet along a fold line extending along the width of the membrane sheet such that the active surface of the membrane sheet is inside the folded sheet;
   (e) placing the folded membrane sheet such that the inactive surface is in contact with the permeate carrier, forming an element leaf having a first end near the fold of the membrane sheet and a second end opposite and parallel to the fold, with the first and second opposing edges folded and connecting the first and second ends, and having a first portion near the permeate carrier and a second portion separated from the permeate carrier by the first portion;
   (f) applying adhesive to the membrane sheet, the permeate carrier, or a combination thereof, such that the adhesive extends across the membrane leaf near the third edge and near the first and second opposing edges;
   (g) winding the element leaf around the collection tube, with the first end of the element leaf near the collection tube, forming a spiral wound element.

2. The method of claim 1, further comprising curing the adhesive, then removing a portion of the spiral wound element corresponding to the first and second opposing edges of the element leaf, wherein the element leaf, after such removal, still has adhesive completely sealing the membrane sheet about the permeate carrier along the second end and the first and second opposing edges.

3. The method of claim 1, wherein step (e) comprises placing the membrane sheet such that the stiffening bridge feature is with the second portion of the membrane sheet.

4. The method of claim 1, wherein a central region of the active surface of the membrane sheet, between the feed spacing regions, is empty of feed spacing elements.

5. The method of claim 1, wherein the stiffening bridge feature does not wrap around the third edge.

6. The method of claim 1, wherein the stiffening bridge feature does not seal the permeate carrier at the second end of the element leaf.

* * * * *